(12) United States Patent
Chu et al.

(10) Patent No.: US 6,544,577 B1
(45) Date of Patent: *Apr. 8, 2003

(54) DEBITTERED CITRUS PULP AND PROCESSING

(75) Inventors: Osvaldo A. Chu, Sarasota, FL (US); Mark A. Pepper, Sarasota, FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,577

(22) Filed: Apr. 24, 2000

Related U.S. Application Data

(63) Continuation-in-part of application No. 09/209,161, filed on Dec. 10, 1998, now Pat. No. 6,054,168.

(51) Int. Cl.⁷ .................................................. A23L 2/58
(52) U.S. Cl. ..................... 426/599; 426/333; 426/478; 426/616
(58) Field of Search .......................... 426/599, 616, 426/333, 478

(56) References Cited

U.S. PATENT DOCUMENTS

| | | | |
|---|---|---|---|
| 3,165,415 A | 1/1965 | Kilburn et al. | |
| 3,801,717 A | 4/1974 | Huffman | |
| 4,413,017 A | * 11/1983 | Loader | 426/616 |
| 4,439,458 A | 3/1984 | Puri | |
| 4,477,481 A | 10/1984 | Eisenhardt, Jr. et al. | |
| 4,514,427 A | 4/1985 | Mitchell et al. | |
| 4,522,836 A | 6/1985 | Dechow et al. | |
| 4,643,902 A | 2/1987 | Lawhon et al. | |
| 4,666,721 A | 5/1987 | Norman et al. | |
| 4,959,237 A | 9/1990 | Walker | |
| 4,965,083 A | 10/1990 | Norman et al. | |
| 5,202,142 A | 4/1993 | Gresch | |
| 5,411,755 A | 5/1995 | Downton et al. | |
| 5,817,354 A | 10/1998 | Mozaffar et al. | |
| 5,885,638 A | 3/1999 | Takayanagi et al. | |
| 6,054,168 A | 4/2000 | Lioutas et al. | |

OTHER PUBLICATIONS

Hernandez et al. "Evaluation of Ultrafiltration and Adsorption to Debitter Grapefruit Juice and Grapefruit Pulp Wash", Journal of Food Science, vol. 57, No. 3, 1992, pp. 664–666, 670.*

Hernandez et al, Evaluation of Ultrafiltration and Adsorption to Debitter Grapefruit, Journal of Food Science, 1992.

* cited by examiner

*Primary Examiner*—Helen Pratt
(74) *Attorney, Agent, or Firm*—Cook, Alex, McFarron, Manzo, Cummings & Mehler, Ltd.

(57) ABSTRACT

Citrus pulp products are provided which incorporate components from pulp material separated from a citrus juice source. Naringin, limonin or other bitterant levels are reduced substantially in the pulp components. In particular applications, the debittered citrus pulp is a grapefruit-originating bland clouding agent, a citrus pulp wash bland clouding agent, or a citrus peel juice bland clouding agent.

15 Claims, 1 Drawing Sheet

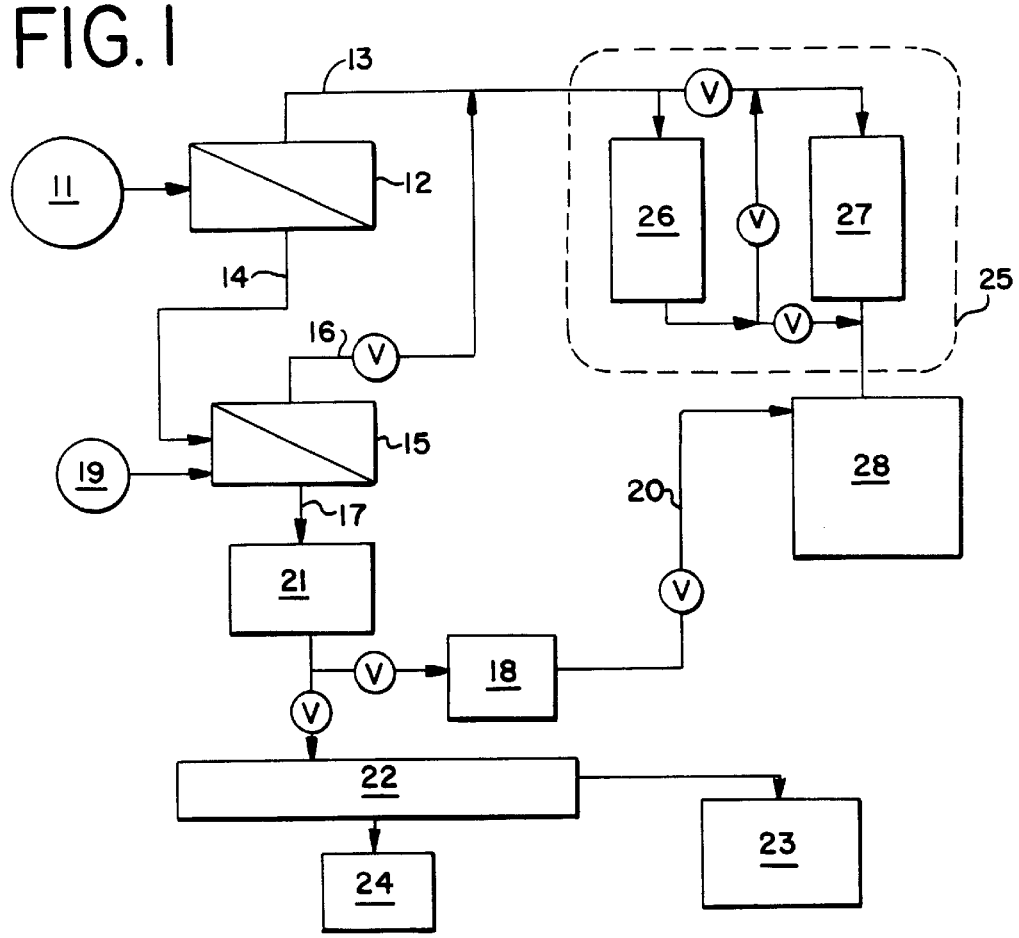
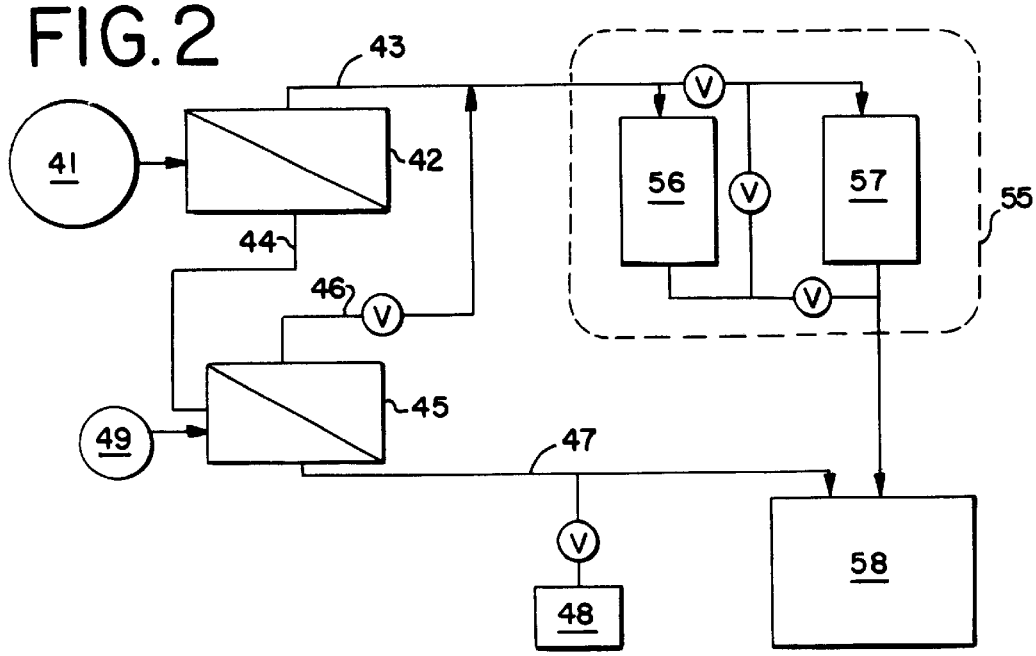

DEBITTERED CITRUS PULP AND PROCESSING

CROSS-REFERENCE TO RELATED APPLICATION

This is a continuation-in-part of application Ser. No. 09/209,161, filed Dec. 10, 1998, now U.S. Pat. No. 6,054,168.

BACKGROUND OF THE INVENTION

This invention generally relates to citrus-originating products and processes for making them. More particularly, the invention separates a citrus juice source into a permeate liquid and a retentate containing virtually all of the pulp present in the citrus juice source. This pulp retentate is subjected to diafiltration, which reduces levels of bitterants such as naringin and limonin within the pulpy material, and the diafiltration retentate is processed as or into useful pulp products and/or clouding agents which have blandness characteristics as desired.

Citrus fruits have long been recognized as valuable sources of important nutrients. More recently, health benefits and disease retarding or treating benefits of citrus sources have come to be more fully recognized as advantageous and beneficial when ingested. Accordingly, there is a general belief that increasing the intake of citrus-originating foods is a beneficial and important objective in the overall scheme of human health.

Segments of the population are less than enthusiastic about certain characteristics of citrus products, such as bitterness, acidity, and a thick consistency. Concerns about these types of characteristics are perhaps most prevalent when the citrus product or ingredient is grapefruit originating. Other citrus fruits can present these types of concerns, including orange, tangerine and lemon fruits. In terms of volume of juice and percentage of dislike in the juice-consuming population, grapefruit products and non-traditional orange-originating products present both the greatest challenge and the most promising potential. Heretofore, these resources have been underutilized due to these types of characteristics of grapefruit sources and non-traditional other citrus sources, which characteristics can be considered objectionable to certain segments of the population.

Numerous approaches have been taken in the past which incorporate various filtration and ion exchange technology in order to operate upon citrus juice sources with a view toward preparing a variety of different products and byproducts. These approaches typically do not substantially change the characteristics of or operate on pulp components. It has long been known that citrus pulp can be separated from citrus juice. Often, this involves removing pulp so as to provide a so-called clarified juice. In those instances, the separated pulp is discarded, used in low-value products such as animal feed, or is stored for reintroduction of some of it into juice products which are formulated to have high pulp contents.

It will thus be seen that, in many instances, citrus fruit pulp is not used in a high value manner. For this reason and others, citrus fruits are not used to their full potential, and many valuable nutrients are not put to use in a manner which directly benefits people. This is particularly true for separated components which include the citrus pulp. There is accordingly a need for approaches which allow a more complete realization of the potential of citrus fruits, and especially of grapefruit sources and other currently under utilized citrus sources.

Also needed is a natural source of bland clouding agent or pulp for use in juice products and other potential uses. Fulfilling these needs with citrus sources would allow for pulp products and clouding agents which are more nutritious than in the past and which are particularly economical.

SUMMARY OF THE INVENTION

In accordance with the present invention, citrus fruit sources are processed into pulp products which are relatively low in bitterness attributes, and which can be of reduced acidity as desired. These products include a bland clouding agent or source of bland pulp. Each of these products is entirely natural. The nutrients present in the citrus fruit source are effectively recovered in one or more of the products. Included is diafiltration of a pulp-rich retentate from filtration of a citrus juice supply or concentrated citrus juice supply. Bitterant reduction results. Pulpy retentate from the diafiltration is especially bland and can be further processed such as to reduce moisture levels.

It is accordingly a general object of the present invention to provide improved citrus juice products and processes which are and/or incorporate bland pulp components.

Another object of the present invention is to provide improved citrus fruit processing and products which improve the overall yield of citrus fruit sources.

Another object of this invention is to provide improved citrus juice pulp products which are incorporated into food and beverage products without adding undesirable bitterness flavor notes.

Another object of the present invention is to provide an improved bland pulp or clouding agent which is a retentate from a citrus pulp source and processes for preparing and using same.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 1 is a schematic representation of an embodiment of the invention which can be used in preparing a debittered pulp which can be collected or added to a juice product; and FIG. 2 is a schematic representation of another embodiment of the invention.

DESCRIPTION OF THE PREFERRED EMBODIMENTS

The present invention is directed toward citrus fruit originating products and processes for making them. Citrus fruits include grapefruit, orange, tangerine and lemon fruits. The invention is well suited for use with grapefruit sources and for low value orange, grapefruit and other citrus sources, as well as for other citrus juice sources. At times, the citrus fruit which is discussed herein is grapefruit, and its primary citrus bitterant, naringin. The invention successfully addresses concerns regarding perceived negative attributes of grapefruit-originating products. The principles of this invention also are applicable to other citrus fruit sources, including juice extracted from the peel and pulp fractions of citrus fruits. When such sources are orange sources, its primary bitterant to be contended with is limonin. Bland citrus-originating clouding agents and pulp products with reduced negative attributes are provided.

With reference to FIG. 1, a citrus juice 11 is the originating material. It can be, for example, a grapefruit juice, a concentrated grapefruit juice, or an orange or grapefruit peel juice or a pulp wash product from orange or grapefruit processing. A typical juice source would have a soluble solids or sugars level of 5–15° Brix. As is well-known in the art, such Brix levels will be considerably higher as the juice source is provided in a more concentrated condition, so that these solids or sugars correspondence levels can be as high as 60° Brix and above.

Citrus juice 11 will have a level of natural bitterant(s) which varies with the originating fruit. Typical ranges are between about 500 ppm and about 1200 ppm naringin for grapefruit sources and about 5 ppm to about 100 ppm limonin for orange sources. Supply 11 will also have a naturally occurring acidity level, typically primarily citric acid, of between about 0.70 weight percent to about 1.20 weight percent. Citrus juice source 11 flows into a membrane filtration unit 12. Typically unit 12 will incorporate an ultra filtration membrane and/or a micro filtration membrane. A typical ultra filtration membrane of this type will have a minimum pore size of about 30 Angstroms, which generally equates to a Molecular Weight Cut Off (MWCO) of about 2000. A typical ultra filtration membrane maximum pore size is about 1000 Angstroms (0.1 micron), which generally equates to 100,000 MWCO. A typical micro filtration membrane of this type will have a pore size range of between about 0.1 micron and about 1.0 micron.

Filtration unit 12 separates the flow from the citrus juice source 11 into a permeate which moves into a transfer member 13 and a retentate which moves into a transfer member 14. This permeate continues to have a Brix level, a bitterant (e.g., naringin or limonin) level and an acidity level approximating those of the citrus juice source 11. It is substantially devoid of any pulp or clouding solids. The retentate from filtration unit 12 retains virtually all of the natural solids or pulp material. This retentate can be generally referred to as citrus pulp solids. It also has the Brix level, bitterant level and acidity level which approximate or are greater than those of the citrus juice source 11. This retentate contains the suspended solids such as proteins and fibers and high molecular weight carbohydrates such as pectins associated with citrus cloud.

A diafiltration unit 15 receives the citrus pulp retentate from the transfer member 14. As is generally known in the art, a diafiltration unit accomplishes filtration through the use of a washing system which applies a liquid to the filtration media. It has been found that such an approach allows soluble components within the citrus pulp retentate to be dissolved so as to pass through the filtration media, while the pulp solids collect as a diafiltration retentate. In an illustrated arrangement, between approximately 75% and 90% of the soluble components find their way into the diafiltration permeate and to transfer member 16. It has been found that, by proceeding with this approach, most of the following components find their way into the diafiltration permeate: naringin limonin or other bitterant(s), sugars, acid, vitamins and nutrients including vitamin C, minerals and the like. Conversely, only between about 5% and 25% of these same components (including naringin or limonin) remain in the diafiltration retentate, which passes to a transfer member 17.

This diafiltration retentate has been found to be an all-natural bland clouding agent. It can have a very low bitterant concentration. For grapefruit processing, a naringin level of between about 20 ppm and about 100 ppm is attainable. Higher naringin levels can be selected, as the need dictates, up to about 200 ppm, for example. An example of a useful naringin level can be between about 50 and 180 ppm, or between about 80 and 150 ppm, often not greater than about 120 ppm. For orange products, the limonin level can be reduced to levels below 5 ppm.

Acidity reduction also is achieved by the diafiltration system. This diafiltration retentate clouding agent material has an acidity level of not higher than approximately 0.3 weight percent. Higher acidity levels can be selected, such as high as about 0.5 weight percent, based upon the total weight of the retentate. Its sugar content is relatively low, this bland clouding agent being at about 2–3° Brix.

This all-natural bland clouding agent material passes from the collection vessel 21 into receptacle 18. It has been found to be suitable as a source of pulp or "cloud" for a filler juice or a stand-alone juice product. It has been found that this product can be used as an additive, such as through transfer member 20, for juice products. As such an additive, it provides an all-natural bland clouding agent which has been found to be instrumental in providing visual cues which allow a consumer to identify the citrus source, even for a juice which has a very low bitterant level and has a reduced acidity level.

The relative percentage amount of diafiltered materials varies with the particular type of equipment within which the diafiltration is carried out. This also varies in accordance with the volume of liquid, typically water, which is used in the diafiltration equipment, such as from wash source 19, as well as the number of diafiltration washings. More particularly, the volume of wash liquid from source 19 will be from about 2 times to about 5 times the volume of citrus pulp retentate entering the diafiltration unit 15 from the transfer member 14. It has been found that suitable results can be achieved in a typical large-scale diafiltration unit if the wash volume is between about 2.5 and about 4 times the volume of the citrus pulp entering the diafiltration unit 15. Preferably, the wash liquid is at a temperature of between about 80° F. and about 130° F. (about 26° and about 55° C.).

Depending upon the relative amount of water within the all-natural bland clouding agent, it may be desired to reduce its water level in order to provide a somewhat more concentrated clouding agent. Typically, the water concentration of the pulpy retentate at area 21 is approximately 80 to 90 weight percent or less. In this instance, the all-natural bland clouding agent will move from area 21 to a separation apparatus 22 which is suitable for separating liquids and solids. A typical separation apparatus is a filter press. Other options include a centrifuge, a decanter, or a vibrating press. It can include traditional crossflow filtration filters or devices using vibrating filter technology. Passage of the all-natural bland clouding agent material through the separation apparatus 22 forms a pulp wash byproduct 23 and an all-natural bland concentrated pulp or clouding agent 24, typically having a water content of approximately 70 to 80 weight percent or less. This concentrated product has properties similar to the all-natural bland clouding agent material 18, as adjusted by the reduced water level. If desired, this could be added to a juice product.

With further reference to FIG. 1, the permeate flow or pulp byproduct flow from the diafiltration unit can be moved from the transfer member 16 to a debittering and/or deacidifying section 25. This flow contains substantially all of the nutrients from the flow into the diafiltration unit. This passage can be directly into the section 25 or into transfer member 13 before it enters debittering and/or deacidifying section 25. At section 25, one or more debittering columns 26 are included. This debittering line is as generally known in the art and results in substantial reduction of naturally occurring bittering agents. Typically, adsorption resins are used in section 25. Commercial adsorption systems are available for use in section 25. Examples include systems incorporating ion exchange resins such as cationic polystyrene adsorbent resins, cationic acrylic adsorbent resins, polyamide resins, anionic polystyrene copolymers which release chloride groups, basic anionic polystyrene resins having quaternary ammonium active groups, and other suitable resins or other adsorbents which are known and available in the art for use in these types of systems. Examples of adsorbents and ion exchange resins for debittering and/or deacidification are found in U.S. Pat. Nos. 4,297,220, 4,439,458, 4,514,427 and 5,817,354, each incorporated hereinto by reference.

For grapefruit sources, the primary bittering agent removed from the all-natural bland clouding agent material is naringin, which is the predominant flavanone glycoside that naturally occurs in grapefruit. Compounds falling within the limonoids group are also found in citrus fruits, including limonin and nomilin. In orange sources, the primary bittering agent removed is limonin. Other bittering agents can be removed here. The non-bitterant flavanone glycoside hesperidin is predominant in orange and tangerine citrus fruits. These types of bitterants are substantially reduced within the debittering columns and during the diafiltration according to the invention.

With particular reference to grapefruit, when a substantial quantity of the naringin content is removed from the all-natural blanding agent material, the result is a grapefruit juice pulp which is substantially less bitter than unprocessed grapefruit juice pulp. When the naringin level is especially substantially reduced, it can be difficult to identify the resultant pulp materials as grapefruit originating.

It will be appreciated that the acidity of the citrus juice source 11 can be reduced. In these instances, the section 25 includes one or more deacidification columns 27 and receives juice flow from transfer members 13 and 16 (when provided). Deacidification equipment represented by column 27 is generally known. It has the ability to significantly reduce the acid content of citrus juices. Many citrus juices have a natural acidity of at least about 0.5 weight percent. A typical acidity content after passage through column 27 and into a receptacle 28 will be between about and about 0.9 weight percent. A typical range is between about 0.4 and about 0.8 weight percent acid, typically as citric acid.

Referring now to FIG. 2, with this embodiment, some or all of the all-natural bland clouding agent is added to the clear juice from a debittering and/or deacidifying section 55. If desired, this addition can be made within a receptacle of cloudy juice product 58, as generally illustrated. Excess all-natural bland clouding agent can be collected in receptacle 48, if all is not to be directly used to form the cloudy juice product 58.

The cloudy juice product 58 is useful as a cloudy filler juice or as a cloudy stand-alone juice. When the latter originates from a grapefruit source, it is a unique grapefruit juice product which is easily recognized as a grapefruit juice while avoiding what a segment of the population finds objectionable in unprocessed grapefruit juice, especially naringin content and also acidity, while still maintaining virtually the same level of pulp within the grapefruit juice. High pulp juice products also can be provided. With this aspect of the invention, the pulp itself is not a source of objectionable levels of bitterants or acidity, but instead the bland pulp or clouding agent is reunited with the modified liquid component flowing from section 55. When the product is to be a cloudy filler juice, usually a lesser quantity of pulp can be added than for a cloudy stand-alone juice.

Generally speaking, in order for a juice to be properly labeled in accordance with governmental regulations, it must be organoleptically recognizable or identifiable as that juice. Typically, taste tests are instrumental in determining whether or not a juice is recognized as the particular juice, for example grapefruit juice. For example, a clear filler juice having a naringin level in the 120 ppm range (or in some cases lower) and an acidity in the 0.8 weight percent range (or in some cases lower) and a Brix value in the range of 10° Brix may not be recognized as grapefruit juice by a majority of taste panelists, whereas adding the all-natural bland clouding agent to this formulation at a level of at least about 5 weight percent, based upon the total weight of the filler juice, results in a cloudy filler juice which consistently has been organoleptically identified as grapefruit juice by a majority of taste panelists.

As an additional example, when this same type of grapefruit-originating cloudy filler juice is used in making a blended juice product, with key juice sources, the fact that the product includes grapefruit juice as one of the juices was not readily detectable. This provides the advantage of providing a filler juice which is a true natural juice without the at times perceived negative characteristic citrus juice flavor and especially the bitterness associated with it. Such a product has the nutritional positives of citrus juice without negatives which are perceived by certain segments of the population.

A citrus juice source 41 flows into membrane filtration unit 42, with the permeate flowing out to transfer member 43 and the citrus pulp retentate flowing to transfer member 44 and into diafiltration unit 45. Wash source 49 flows into the diafiltration unit 45, while transfer member 46 receives the diafiltration permeate and transfer member 47 receives the diafiltration retentate. When provided, debittering columns 56 and/or diafiltration columns 57 of the section 55 perform substantially as described above with respect to section 25.

With more particular reference to the diafiltration units 15 and 45, a number of different units can be used. Included are those incorporating tubular ultra filtration membrane cartridges. Others are of types which use hollow fiber and ceramic ultra filtration and/or micro filtration cartridges.

Illustrations of the disclosure herein are provided in the following Examples.

EXAMPLE 1

Grapefruit concentrate was passed through a hollow fiber micro filtration unit. In order to debitter the juice product flow, the permeate therefrom is passed through a Koch debittering resin column. During debittering, adsorption of the naringin onto the surface area of the resin material of the commercial unit was carried out. The original naringin level was 735 ppm, and the juice permeate was debittered to a naringin level of about 120 ppm.

The retentate from the hollow fiber micro filter unit was added to 8 gallons of water, and the resulting slurry was circulated through an ultra filtration Niro crossflow filtration unit, and 8 gallons of permeate were removed. This profile was repeated four times until the soluble solids/sugars within the retentate dropped below 1.0° Brix. The initial level was 10.87° Brix.

This diafiltration was found to be highly successful in decreasing the naringin concentration from the original value of 735 ppm to a value in the final diafiltration pulp material retentate of 86 ppm. This represented an 88% reduction in naringin levels, this having been accomplished with four equal-volume (8 gallon) washings. The initial acid level was 0.88 weight percent. At the final diafiltration, the retentate had an acidity of 0.11 weight percent. Analysis indicated that a very large percentage of the vitamin C was removed during this diafiltration and passed into the permeate. The initial flow into the diafiltration unit had a vitamin C content of 25.89 mg/100 ml, and the final retentate from the diafiltration had a vitamin C level of 3.02 mg/100 ml. A color analysis indicated that there was some change in color, but not a great deal. For example, the flow into the diafiltration unit was analyzed to have a so-called OJ Index of 31.2. After completion of the diafiltration, the retentate had an OJ Index of 28.7. The "L" transmittance was 66.30 going in and 65.38 for the final retentate. The "a" transmittance going in was −4.61, and the final retentate value was −5.14. The "b" transmittance was 18.83 before diafiltration and 12.04 after the last diafiltration.

After the second diafiltration wash, the initial naringin level of 735 ppm was reduced to 223 ppm in the all-natural pulp material retentate. After the third wash, the naringin level was reduced to 141 ppm, with the fourth wash level being 86 ppm. The initial water wash temperature was 82° F. (27.8° C.). Each subsequent wash was generally higher in temperature, the highest temperature being 123.2° F. (50.7° C.). The average wash liquid temperature during the diafiltration operation was 114° F. (45.6° C.). The resulting product was an all-natural grapefruit-originating bland pulp material or clouding agent.

EXAMPLE 2

The approach of Example 1 was generally repeated. The feed volume was 6 gallons of the retentate pulp material and 6 gallons of water for each of 4 diafiltration washes. The water temperature ranged from 94° F. to 116.8° F. (34.4° C. to 47° C.). Initial naringin level was 735 ppm. After the first diafiltration wash, the naringin level in the retentate all-natural pulp material was reduced to 295 ppm. After two washes, the level was 211 ppm. After three washes, the naringin level was 153 ppm, and after four washes, it was 106 ppm.

Sugars or soluble solids level for the feed into the diafiltration unit was 10.6° Brix. After final diafiltration washing, the level of sugars or soluble solids in the retentate pulp material was 0.9° Brix. Initial acidity was 0.88 prior to diafiltration. After the final diafiltration wash, the acidity of the all-natural retentate pulp material was 0.12 weight percent. After the last diafiltration wash, the vitamin C level of the retentate pulp material was reduced to 1.40 mg/ml. Color values were an OJ Index of 28.2, a "L" transmittance of 66.03, an "a" transmittance of −5.02, and a "b" transmittance of 10.51. This all-natural grapefruit-originating bland clouding agent adds a desirable cloudy character to any number of consumable products.

EXAMPLE 3

Another run was made generally along the lines of Example 1. This utilized a Niro separation skid with two Koch Super-Core modules. Cross-flow diafiltration was used in the removal of solubilized naringin from the grapefruit juice retentate. In this run, before making the first diafiltration water addition, the retentate was concentrated by initiating the cross-flow without water addition, the water reduction being from about 220 pounds to about 110 pounds, the reduction designating the amount of water removed during this initial concentration step. Thereafter, the 110 pounds of concentrated feed retentate were washed with 110 pounds of water at about 120° F. (48.9° C.), followed by a second wash of 110 pounds, and then a third wash of 55 pounds of water at about 120° F. (48.9° C.). Thus, the diafiltration was at 2.5 times the volume of the pulp material being diafiltered.

Initial naringin level was 750 ppm, and the final retentate all-natural bland clouding agent or pulp material had a naringin level of 130 ppm. The initial acidity level was 0.91 weight percent, and the final acidity level of the diafiltered retentate was 0.24 weight percent. Initial Brix level was 11.28° Brix, and the final level was 4.35° Brix of the diafiltered retentate pulp material. Regarding color, the initial OJ Index was 30.9, and the final OJ Index of the retentate pulp material was 30.7. The "L" transmittance was 67.55 initially and 72.17 after diafiltration. The "a" transmittance was −4.65 initially and −3.83 after diafiltration. The "b" transmittance was 18.44 initially and 18.32 after diafiltration. An all-natural grapefruit-originating bland clouding agent was provided.

EXAMPLE 4

A procedure as generally described with respect to Example 3 was followed. The initial concentration prior to diafiltration was 1.5 times reduction, and 2 full volume diafiltration steps were carried out. The retentate starting material prior to concentration was as in Example 3. After final diafiltration, the naringin level was 274 ppm, the acid level was 0.33 weight percent, and the sugars content was 4.87° Brix in the resulting retentate all-natural pulp material.

EXAMPLE 5

Taste tests were conducted on grapefruit juice products in order to evaluate whether or not the particular grapefruit juice product was identifiable as grapefruit juice. A control grapefruit juice was used in the taste comparisons, the control juice having these specifications: 3.23 pH, an acidity of 1.3 weight percent as citric acid, 10° Brix soluble solids, about 700 ppm naringin, and a natural and untreated pulp concentration of 10.5 volume percent.

A grapefruit juice formulation "A" was prepared as described herein to have the following specifications: 3.48 pH, an acidity of 0.82 weight percent as citric acid, 7.5° Brix soluble solids, 118 ppm of naringin, and a concentration of 12.5 volume percent of the all-natural bland pulp material according to the invention.

Another grapefruit formulation "B" prepared as described herein had the following specifications: 3.47 pH, an acidity of 0.78 weight percent as citric acid, 9.9° Brix soluble solids, 125 ppm naringin, and a concentration of 12.5 volume percent of the all-natural bland pulp material according to the invention.

Each participant was questioned if he or she had consumed grapefruit juice within the last 30 days, this question being asked to distinguish grapefruit "users" from "non-users". For the juice "A" test, 28.5% were placed in the user category, and 71.5% were placed in this non-user category. For the juice "B" test, 35% were placed into the user category, and 65% were placed in the non-user category. Each person taste tested the control and the grapefruit juice "A" and was asked if they would identify juice "A" as grapefruit juice. A total of 71.5% identified the juice as grapefruit juice, and 28.5% did not. For juice "B", 70% identified as grapefruit juice, and 30% did not.

A different grapefruit juice product, juice "C" was tested in the same manner. This juice product had these specifications: 3.74 pH, 0.64 weight percent acidity as citric acid, 9.8° Brix soluble solids, 125 ppm naringin, and 12.5% of the all-natural bland pulp in accordance with the invention. This panel had 22.5% grapefruit users and 77.5% non-users. 52.5% of the total respondents identified this juice product as grapefruit juice, whereas 47.5% did not identify it as grapefruit juice.

A further grapefruit juice formulation, juice "D" was subjected to the same taste testing. It was a clear juice as made herein but contained no pulp. Its specifications were as follows: 3.48 pH, 0.82 weight percent acidity as citric acid, 10.1° Brix soluble solids, 123 ppm naringin, and no pulp (whether untreated or blanded). This panel included 30% grapefruit juice users and 70% non-users. A total of only 42.5% of the panelists identified juice "D" as grapefruit juice, whereas 57.5% of the panelists did not identify this as grapefruit juice.

Another grapefruit juice formulation, juice "E" was taste tested in the same manner. Juice "E" had these specifications: 3.48 pH, 0.80 weight percent acidity as citric acid, 10.5° Brix soluble solids, 120.7 ppm naringin, and 3.8 volume percent of the all-natural bland pulp or clouding agent in accordance with the invention. This panel had 25% users and 75% non-users, and 60% of the total respondents identified this juice product as grapefruit juice, whereas 40% did not identify it as grapefruit juice.

EXAMPLE 6

Further taste tests were conducted on grapefruit juice products generally as in Example 5, except the ratio of grapefruit juice "users" to "non-users" was selected to be 90 to 10, which is more in accordance with grapefruit juice consumption in the U.S.A. Also, the control grapefruit juice was consistently tasted after the formulation being evaluated. The control grapefruit juice used in the taste comparisons had these specifications: 3.23 pH, an acidity of 1.30 weight percent as citric acid, 10% Brix soluble solids, 642 ppm naringin, and a natural and untreated pulp concentration of 10.5 volume percent.

Each participant was questioned if he or she had consumed grapefruit juice within the last 30 days. For each test, 10% answered "yes", and these participants constituted the "user" category. Those answering "no" (90%) made up the "non-user" category for the following four formulations.

A grapefruit juice formulation "R" was prepared as described herein to have the following specifications: 3.84 pH, an acidity of 0.84 weight percent as citric acid, 10.1° Brix soluble solids, 118 ppm of naringin, and a concentration of 5.0 volume percent of the all-natural bland pulp material according to the invention. Each person taste-tested the juice "R" and then the grapefruit control. Each was asked if he or she would identify juice "R" as grapefruit. A total of 87% identified the juice as grapefruit juice, and 13% did not.

Another grapefruit formulation "S" prepared as described herein had the following specifications: 4.47 pH, an acidity of 0.40 weight percent as citric acid, 9.7° Brix soluble solids, 193 ppm naringin, and a concentration of 5.0 volume percent of the all-natural bland pulp material according to the invention. For juice "S", 67% identified the juice as grapefruit juice, and 33% did not.

A different grapefruit juice product, juice "T" was tested in the same manner. This juice product had these specifications: 4.06 pH, 0.63 weight percent acidity as citric acid, 9.9° Brix soluble solids, 174 ppm naringin, and 5.0% of the all-natural bland pulp in accordance with the invention. 77% of the total respondents identified this juice "T" product as grapefruit juice, whereas 23% did not identify it as grapefruit juice.

A further grapefruit juice formulation, juice "U" was subjected to the same taste testing. It was a clear juice which was rather high in acidity and naringin and contained no pulp. Its specifications were as follows: 3.85 pH, 0.81 weight percent acidity as citric acid, 10.8° Brix soluble solids, 129 ppm naringin, and no pulp (whether untreated or blanded). A total of 69% of the panelists identified juice "D" as grapefruit juice, whereas 31% of the panelists did not identify this as grapefruit juice.

EXAMPLE 7

An orange and cranberry juice blend was prepared which incorporated the grapefruit cloudy filler juice made generally in accordance with FIG. 2. This cloudy grapefruit filler juice had the following average specifications: 3.84 pH, an acidity of 0.80 weight percent as citric acid, 150 ppm naringin, and 4 volume percent of the all-natural clouding agent or pulp prepared as described herein.

This cloudy grapefruit filler juice was concentrated to 59° Brix, after which it had a pH of 5.90. About 410 gallons of this cloudy grapefruit filler juice concentrate were blended with about 180 gallons of orange pulp wash concentrate of 65° Brix and 2.84 pH, about 130 gallons of orange concentrate at 65° Brix and 4.02 pH, about 120 gallons of cranberry concentrate at 47.7° Brix and 11.5 pH, an orange and cranberry flavor formulation, red colorant, and about 320 gallons water. This prepared a concentrated orange cranberry base product. A blended juice product was made from this base. An approximate 1000 gallon batch of such a blended juice product includes about 23 gallons of this orange cranberry base, about 115 gallons of high fructose corn syrup sweetener, and about 865 gallons of water. This single-strength product has an acidity of about 0.5 weight percent acid as citric acid, and is a juice product of about 13° Brix.

Prior to blending, the cloudy filler juice was identifiable as grapefruit juice when at a single strength. In the single-strength blended cloudy juice, the identifiable flavors were those of orange and cranberry and not of grapefruit.

EXAMPLE 8

Orange peels were shredded into pieces no larger than about ¾ inch. The smaller peel pieces were combined with water at water/peel ratios of 0.5/1 to 2.5/1. The water/peel slurry was pressed to separate the peel solids from the peel liquor (juice). The raw peel liquor was centrifuged to separate out a peel oil fraction and a sludge heavy phase from a peel juice having a Brix of about 4 to 8°, with a total solids of about 4 to 10 weight percent. The peel juice was processed through a membrane filtration system, and diafiltration was carried out generally in accordance with Example 1. The primary bitterants removed into the clarified peel juice are limonin, citrus flavonoids, and polyphenolic compounds, the blanded peel or pulp solids (retentate fraction at 10 to 20 weight percent total solids) being an all-natural orange peel originating clouding agent.

EXAMPLE 9

Pulp wash from orange juice processing at 4 to 7 Brix is used as the originating citrus source for preparing an all-natural orange-originating clouding agent by proceeding with a process in accordance with Example 1. Pulp wash is processed through the membrane filtration system to produce a clarified fraction (permeate) and a concentrated pulp fraction containing the suspended solids, high molecular weight carbohydrates, pectin, fibers, as well as bitterants and soluble solids present in the pulp wash feed. Through diafiltration of the retentate fraction, the level of bitterants, sugars and soluble solids are reduced to about half of the original level to produce the bland pulp solids fraction which is the base of the natural cloud product. The primary bitterant for removal from the orange pupl wash stream during this processing is limonin.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A process for providing an all-natural blanded clouding agent, comprising the steps of:
   (a) providing a citrus juice supply having suspended solids, high molecular weight components associated with cloud, and an initial bitterant level which is not substantially reduced from that of the citrus juice supply;
   (b) passing the citrus juice supply through a membrane filtration unit in order to form both a permeate flow of clarified citrus liquid and a retentate flow of pulpy citrus liquid containing substantially all of the suspended solids and high molecular weight components;
   (c) diafiltering said retentate flow of pulpy citrus citrus liquid so as to provide a diafiltration retentate of a bland citrus pulp having a substantially reduced bitterant level which is about one-half or less of the initial bitterant level; and
   (d) collecting said bland citrus pulp as an all-natural blanded clouding agent.

2. The process in accordance with claim 1, wherein said citrus juice supply is a grapefruit juice, pulp wash or peel juice; said all-natural blanded clouding agent incorporates pulp from the citrus juice supply; an said bitterant includes naringin.

3. The process in accordance with claim 2, wherein said initial bitterant level is at least about 500 ppm, and said diafiltering step (c) reduces the bitterant level to not greater than about 180 ppm.

4. The process in accordance with claim 2, wherein said diafiltering step (c) reduces the bitterant level to not greater than about 150 ppm.

5. The process in accordance with claim 2, wherein said diafiltering step (c) reduces the bitterant level to not greater than about 120 ppm.

6. The process in accordance with claim 2, wherein said diafiltering step (c) reduces the bitterant level to not greater than about 100 ppm.

7. The process is accordance with claim 1, wherein said citrus juice supply is an orange juice, pulp wash or peel juice; said all-natural clouding agent incorporates pulp from the citrus juice supply; said bitterant is limonin; and said initial bitterant level is between about 5 and about 100 ppm.

8. The process in accordance with claim 7, wherein said diafiltering reduces the limonin level to not greater than about 10 ppm.

9. The process in accordance with claim 7, wherein said diafiltering reduces the limonin level to not greater than about 3 ppm.

10. The process in accordance with claim 1, wherein said diafiltering step (c) reduces the acidity of the bland citrus pulp to about 0.5 weight percent or below, based upon the weight of the all-natural clouding agent.

11. The process in accordance with claim 1, wherein said diafiltering step (c) reduces the acidity of the bland citrus pulp to about 0.3 weight percent or below, based upon the weight of the all-natural clouding agent.

12. The process in accordance with claim 1, wherein the citrus juice supply is grapefruit juice, pulp wash or peel juice, and said collecting provides a bland citrus pulp having a water content of approximately 70 to 90 weight percent, a narigin content of approximately 200 ppm or less, and an acid content of approximately 0.5 weight percent or less, each parameter being based upon the total weight of the bland citrus pulp.

13. The process in accordance with claim 12, wherein the water content is approximately 70 to 80 weight percent.

14. The process in accordance with claim 1, wherein the citrus juice supply is orange juice, pulp wash or peel juice, and said collecting provides a bland citrus pulp having a water content of approximately 70 to 90 weight percent, a limonin content of approximately 20 ppm or less, and an acid content of approximately 0.5 weight percent or less, each parameter being based upon the total weight of the bland citrus pulp.

15. The process in accordance with claim 14, wherein the water content is approximately 70 to 80 weight percent.

* * * * *